United States Patent [19]
Hobbs

[11] Patent Number: 6,118,518
[45] Date of Patent: Sep. 12, 2000

[54] ASSEMBLY COMPRISING A POCKET 3-D SCANNER

[75] Inventor: Philip C. D. Hobbs, Briarcliff Manor, N.Y.

[73] Assignee: International Business Machines Corporation, Armonk, N.Y.

[21] Appl. No.: 09/256,535

[22] Filed: Feb. 24, 1999

[51] Int. Cl.[7] ............................................. G01B 9/02
[52] U.S. Cl. ..................... 356/4.09; 356/345; 356/349; 356/358
[58] Field of Search ............................. 356/4.09, 345, 356/349, 358

[56] References Cited

U.S. PATENT DOCUMENTS 2,604,004  8/1952  Root, III ............................. 356/4.09
5,589,928  12/1996  Babbitt et al. ......................... 356/358

Primary Examiner—Robert H. Kim
Attorney, Agent, or Firm—Stephen C. Kaufman

[57] ABSTRACT

An assembly comprising a 3-D scanner and suitable for capturing at least one of objects, or textures, or documents. The assembly preferably can be developed as a pocket page scanner having dimensions approximately the size of a chalkboard eraser. The assembly preferably utilizes an alignment-insensitive diode laser interferometer. In operation, the assembly enables a user to scan any page-sized area in e.g., a half of second, store a hundred or so of them, then play them back into a PC infrared port for OCR, printing, archival storage, or further processing.

28 Claims, 6 Drawing Sheets

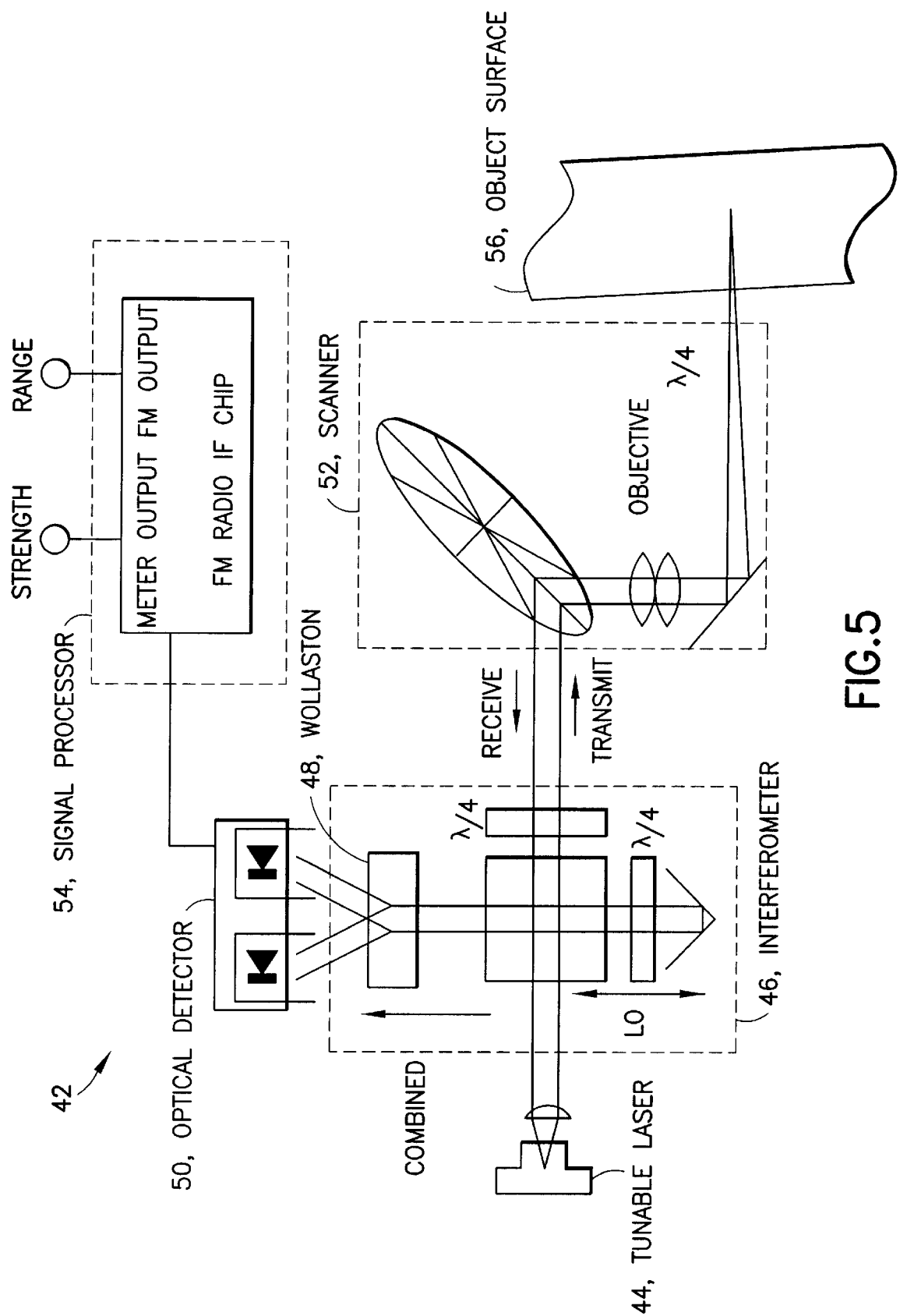

ASSEMBLY COMPRISING A POCKET 3-D SCANNER

BACKGROUND OF THE INVENTION

This invention relates to an assembly comprising a pocket 3-D scanner.

INTRODUCTION TO THE INVENTION

Our work centers on providing a scanning capability for capturing at least one of objects, or textures, or documents.

SUMMARY OF THE INVENTION

We have now discovered novel technology suitable for enabling scanning of at least one of objects, or textures, or documents.

Accordingly, in a first aspect of the present invention, we disclose an assembly comprising:

(1) a laser for providing an optical beam that can be modulated so as to enable time-of-flight ranging;
(2) a subrange scanner which can deviate the path of the optical beam; and
(3) an interferometer, configured so that when it receives at least a portion of the optical beam from the subrange scanner, it can subdivide it to produce transmit and local oscillator beams, and combine the local oscillator beam with at least a portion of an appropriately directed received beam, if present, to produce a combined beam.

In a second aspect of the present invention, we disclose an assembly comprising:

(1) a laser for producing an optical beam that can be modulated so as to enable time-of-flight ranging;
(2) an interferometer, configured so that when it receives at least a portion of the optical beam from the laser, it can subdivide it to produce transmit and local oscillator beams, and combine the local oscillator beam with at least a portion of an appropriately directed received beam, if present, to produce a combined beam;
(3) a scanner that can deflect at least a portion of the transmit beam between set angular limits;
(4) an optical detector, configured so as to intercept at least a portion of the combined beam and produce an electrical signal containing range or beam strength information; and
(5) a subrange scanner which can deviate the path of the transmit beam.

The subrange scanner preferably is controlled so as to reduce a scan position error due to the scanner.

Preferably, the scanner produces a raster pattern, preferably in which the subrange scanner can produce a dither in the frame scan direction at a rate faster than either the line or frame scan rates of the scanner. Here, preferably, the subrange in adjacent scan lines overlap, so that the measurement data from some of the overlapping portions can be compared, and the spatial relationship between the overlapped sections estimated by comparing these data. For example, the comparison can be used to estimate a relative motion component between the assembly and an object surface.

In a third aspect of the present invention, we disclose an assembly comprising:

(1) a laser for providing an optical beam that can be modulated so as to enable time-of-flight ranging;
(2) an interferometer, configured so that when it receives at least a portion of the optical beam from the laser, it can subdivide it to produce transmit and local oscillator beams, and combine the local oscillator beam with at least a portion of an appropriately directed received beam, if present, to produce a combined beam;
(3) a scanner that can deflect at least a portion of the transmit beam between set angular limits;
(4) an optical detector, configured so that if a combined beam is present, it can intercept at least a portion of the combined beam, and produce an electrical signal containing range or beam strength information; and
(5) a signal processor, that can receive the electrical signal and can produce outputs corresponding to combined beam strength and a range between the assembly and an object surface.

This assembly preferably further comprises a subrange scanner for deviating the path of the transmit beam. The subrange scanner may be disposed so that the optical beam encounters it before it encounters the interferometer. In particular, the subrange scanner preferably includes a diffraction grating for deflecting the transient beam in response to a change in its wavelength.

For this configuration, moreover, the laser preferably comprises a diode laser, for example, one having a duty cycle above 5%, and preferably wherein the laser can be tuned by varying a bias current. Here, the bias current preferably comprises a component of the injection current of the laser, wherein the bias current variation waveform can be ramp-shaped over at least a portion of its cycle, or, alternately, can be staircase-shaped over at least a portion of its cycle, for example, with tilted treads over at least a portion of its cycle. Also, with respect to this configuration, we note that the shape of the bias current variation waveform preferably is controlled in order to reduce the variations in total optical dose across the scan range.

Preferably, the range information provides enablement of at least one of the following:

(1) control of the state of focus of the transmit beam;
(2) control of the angular limits of the scan, for making the angular range more nearly perpendicular to an object surface;
(3) control of a distance between the assembly and an object surface;
(4) correction of variations in a distance between the assembly and an object surface;
(5) estimation of the viewing perspective of an object surface as seen from the assembly; or
(6) correction of variations in viewing perspective of an object surface as seen from the assembly.

Preferably, the signal processor can use a measurement of a beat frequency between the local oscillator beam and received beam for measuring the time-of-flight of the received beam.

Preferably, the signal processor can use a measurement of the strength of a beat signal between the local oscillator beam and received beam for measuring the strength of the received beam. The signal processor preferably comprises a filter for rejecting changes in a baseline of a beat signal and undesired amplitude modulations of the optical beam.

BRIEF DESCRIPTION OF THE DRAWING

The invention is illustrated in the accompanying drawing, in which:

FIG. 5 shows an assembly illustrative of the invention in a third aspect; and

DETAILED DESCRIPTION OF THE INVENTION

Figure 1:
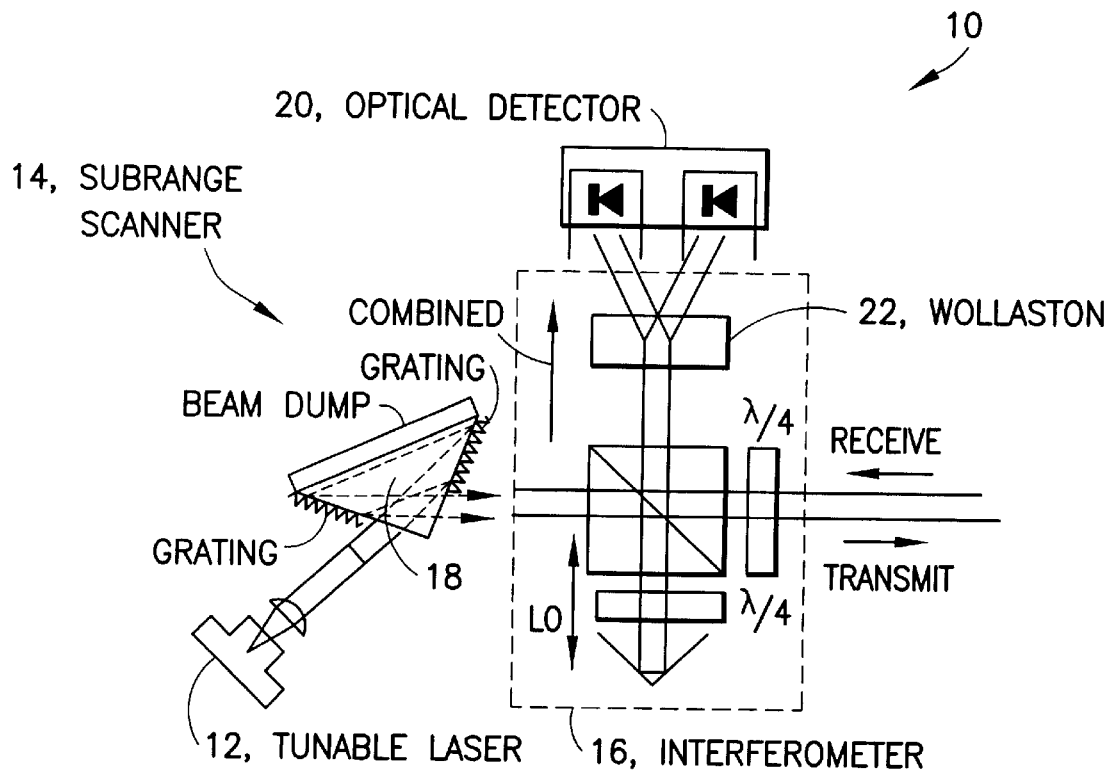
FIG. 1 shows an assembly illustrative of the invention in a first aspect.

An assembly of the present invention, in each of three aspects, has been summarized above. The detailed description proceeds by unfolding, in stages, the invention's various degrees of specificity and preferred embodiments, as referenced to each of the three aspects.

In the interest of clarity, the following detailed description of the invention includes sections which are chiefly or exclusively concerned with a particular part of the invention. It is to be understood, however, that the relationship between different parts of the invention is of significant importance, and the following detailed description should be read in the light of that understanding. It should also be understood that, where features of the invention are described in the context of particular Figures of the drawing, the same description can also be applied to the invention in general and to the other Figures, insofar as the context permits.

Attention is now directed to FIG. 1, (numerals 10–22), which shows an assembly 10 in accordance with the invention in its first aspect. In overview, the assembly 10 includes a tunable laser 12 that can produce an optical beam that can be modulated so as to enable time-of-flight ranging; a subrange scanner 14 which can deviate the path of the optical beam; and, an interferometer 16 configured so that when it receives at least a portion of the optical beam from the subrange scanner 14, it can subdivide it to produce transmit and local oscillator beams, and combine the local oscillator beam with at least a portion of an appropriately directed received beam, if present, to produce a combined beam.

In particular, the FIG. 1 assembly 10 includes the combination of the interferometer 16 and the subrange scanner 14 based on the tunable diode laser 12 and a compound grating device 18. Here, the subrange scanner 14 is optically upstream from the interferometer 16. This configuration can reduce the effects of scattered light and optical losses. If the scanner has efficiency of E, putting it upstream of the interferometer produces a total photon efficiency of E. Putting it in the conventional downstream position forces the received photons to pass through it twice (going and coming). Thus, the total photon efficiency is $E^2$, which since E is often quite low, is a big disadvantage. The drawback is that the beam in the interferometer 16 now moves with the subrange scan, but it turns out that that is not a serious limitation in most instances.

The interferometer shown is a lossless corner-cube Michelson type, which is insensitive to minor misalignment. Polarization diversity may be used to make the polarizing beam splitter cube reflect all of the received beam into optical detectors 20, while allowing all of the LO beam to pass through, so that the two are superposed. The two superposed beams are orthogonally polarized, and so require an analyser to make them interfere. Use of an ordinary analyser and one detector is feasible, but it is preferable to use a Wollaston prism 22 oriented at 45 degrees to the polarization axes, followed by two photodiodes whose photocurrents subtract. The advantage of this scheme is that the interference term is captured losslessly, while the do terms (with their attendant additive excess noise) are cancelled.

Figure 2:
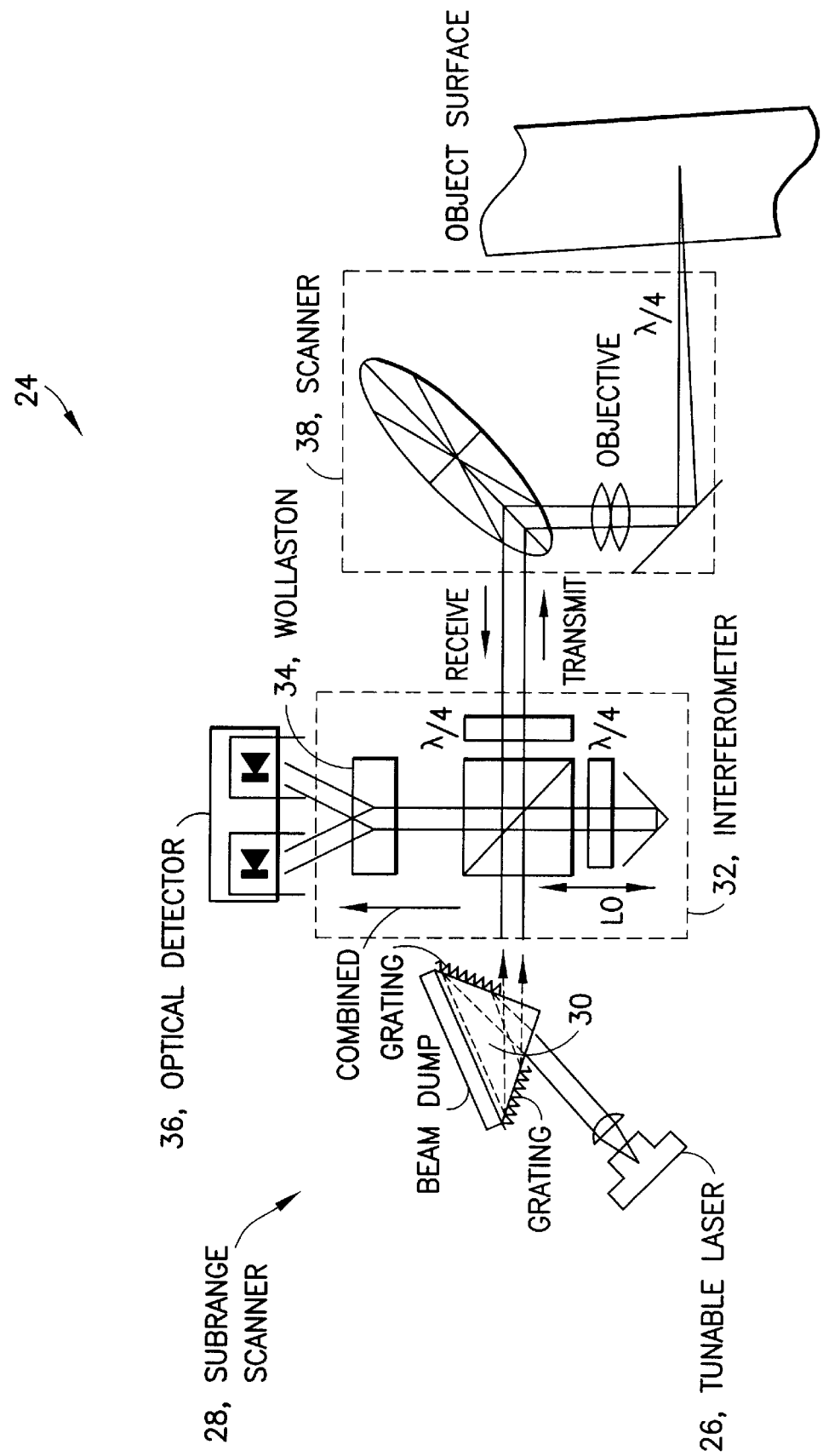
FIG. 2 shows an assembly illustrative of the invention in a second aspect.
Figure 3:
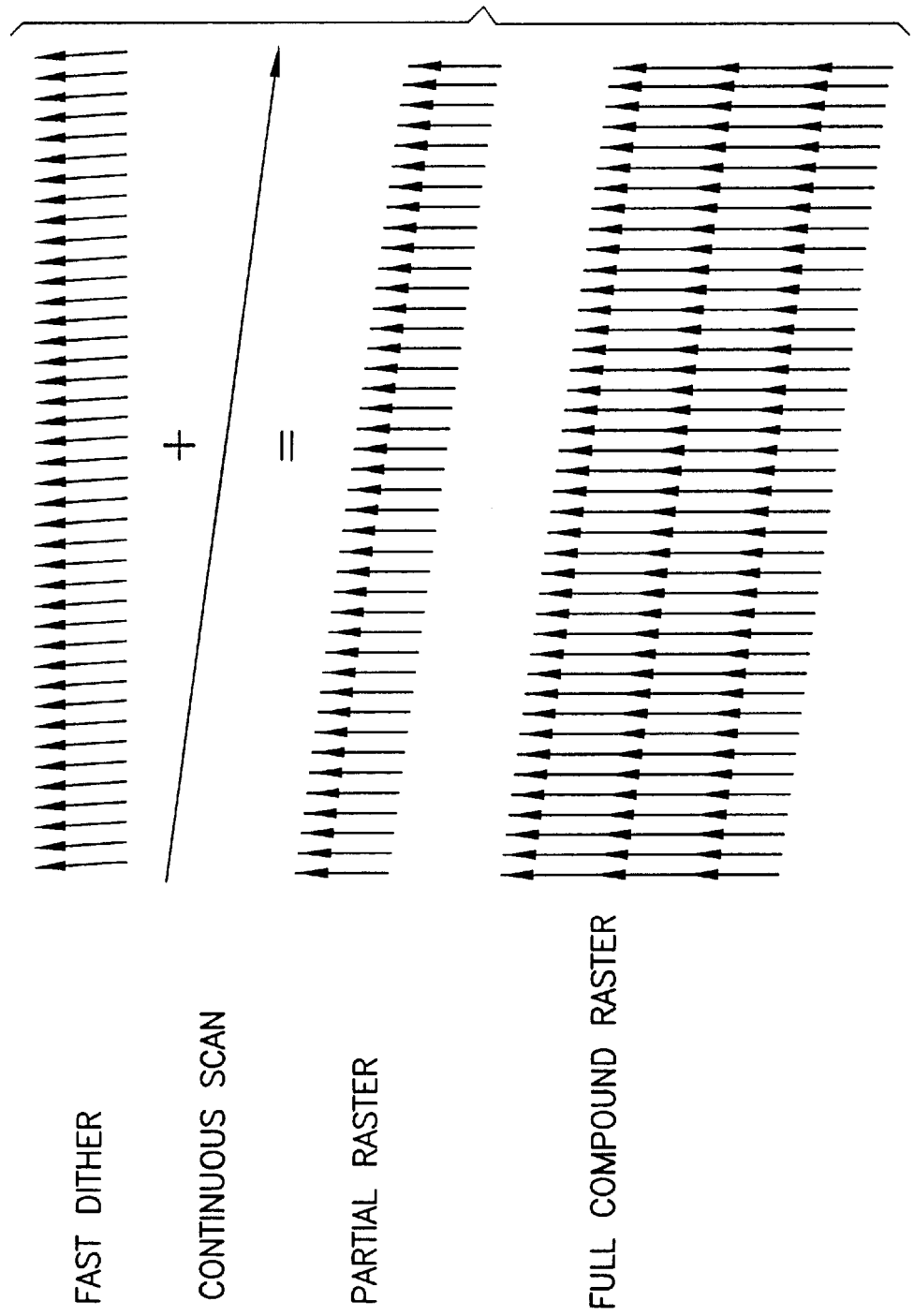

Attention is now directed to FIG. 2, which shows an assembly 24 in accordance with the invention in its second aspect. In particular, the assembly 24 includes the elements shown in FIG. 1, with an addition of a conventional mechanical raster scanner and objective lens 38. The assembly 24 is a complete optical schematic of a working 3-D sensor, with a compound raster scan, as shown in FIG. 3.

Preferably, the scanning is done in a modified raster; a small hologon scanner (30 mm diameter) provides the line scan, and a combination of a tilting mirror and rapid tuning of the diode laser provides the frame scan.

The odd scanning configuration allows short frame times. Acquiring 3,000 lines of data in 500 ms, using a small hologon with 8 facets means a rotational speed of 45,000 rpm, which is completely out of the question except in very expensive systems. Even doing the line scan along the vertical axis of the page still needs 34,000 rpm, which only makes sense in a really high end printer. Diode lasers can be current-tuned very rapidly (1 GHz). If we can get the spot to move very rapidly by 10–50 pels' worth in the frame direction by current tuning, we can make the raster scan 10–50 or so times slower while not losing resolution, as shown in FIG. 3.

The subrange scanner preferably is oriented so as to produce a small dither nearly but not quite perpendicular to the line scan direction. The orientation is chosen so that as the dither sweeps out its range, the combination of the line scan and dither motions makes the focused spot move in exactly the frame scan direction.

This allows an image stripe 10–50 pixels wide to be acquired on each mechanical scan line, depending on the laser characteristics and beam diameter. The scan lines can thus be 10–50 times fewer for the same resolution, and since the mechanical line scanner is usually what limits the scan speed, the pixel rate can be increased by the same factor.

The resulting rotation rates of 3000 rpm or so makes the scanner concept feasible.

Diode lasers have a typical current tuning range of 1–2 $cm^{-1}$ (30–60 GHz) between mode hops, about $1 \cdot 10^{-4}$ of the optical frequency. A change of Dm will cause the hologon to produce an angular deflection in the frame direction of approximately $$\Delta\theta = 2\frac{\Delta v}{v}$$

or around $2 \cdot 10^{-4}$ radians. This angle is a bit less than 1 pixel pitch, unfortunately. A grating with spatial frequency $k_g$ with a beam of propagation constant k incident at $q_i$ produces an output beam whose angle and angular scanning sensitivity are:

$$\theta_0 = \arcsin\left(\sin\theta_i \pm \frac{k_g}{k}\right)$$

and $$\frac{d\theta_0}{dv} = \frac{1 k_g}{v k} \frac{1}{\sqrt{1 - (\sin\theta_i \pm k_g/k)^2}}$$

Figure 4:
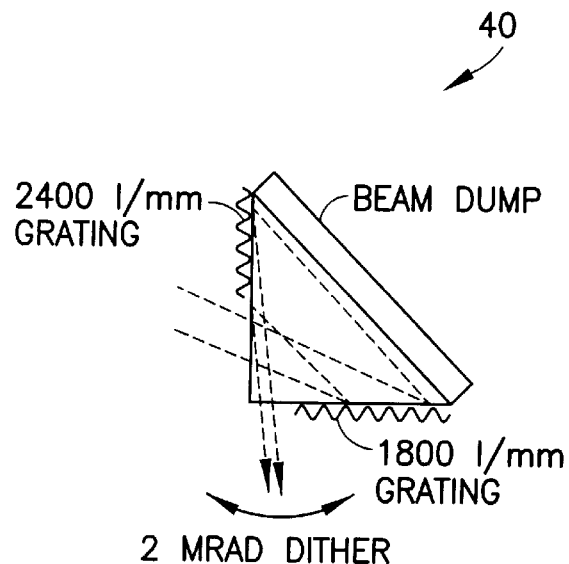
FIGS. 3 and 4 illustrate features of the FIG. 2 invention.

An auxiliary device 40 to do this is shown in FIG. 4. Preferably, the auxiliary device 40 comprises a small triangular plate prism (15 mm×15 mm×3 mm) made of plastic, with a grating embossed on the two legs to increase the angular range sufficiently that the focused spot can move by 10–58 pel diameters. A larger beam allows more spots, up to a bar of 50 for a reasonable sized prism. The same device 40 can be made to serve as a beam circularizer. A beam deflection increase by a factor of about 3 can be gained by circularizing the beam (we are making the long dimension a factor of 3 smaller so that the angular range goes up by the same factor), another factor of 1.6 from the refractive index of the plastic (which allows finer pitch gratings), and the rest by one bounce off each grating. The specular reflections preferably are controlled by placing index-matched black paint on the hypotenuse and flat sides. The main limitations with this technique are that when the gratings are used in air, the beam must leave the second grating near grazing incidence, where the diffraction efficiency is very low (10% for the two gratings together).

This inefficiency is what really makes putting the subrange scanner upstream of the interferometer very important.

Figure 6:
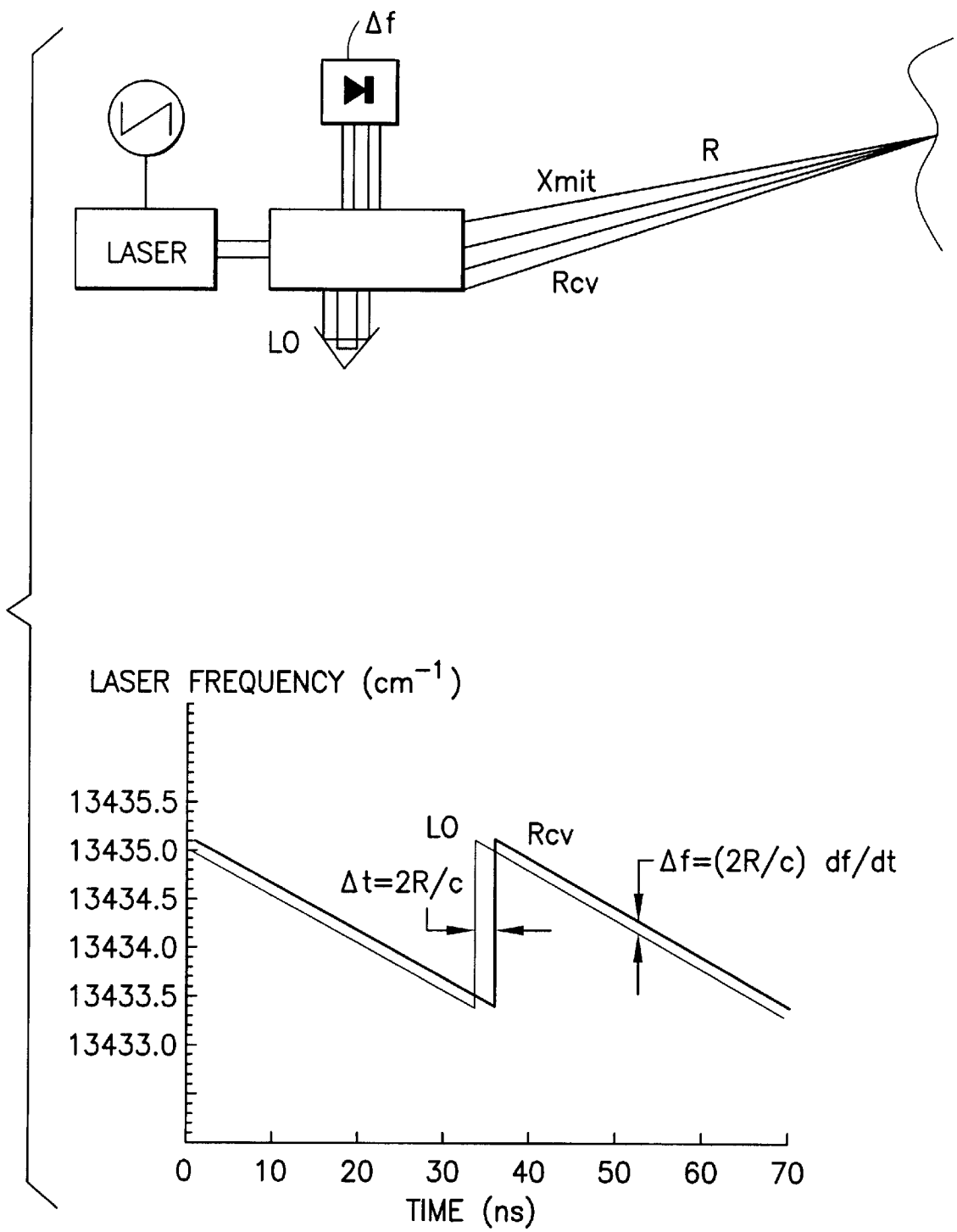
FIGS. 6 and 7 illustrate operational aspects of the FIG. 5 invention.
Figure 7:
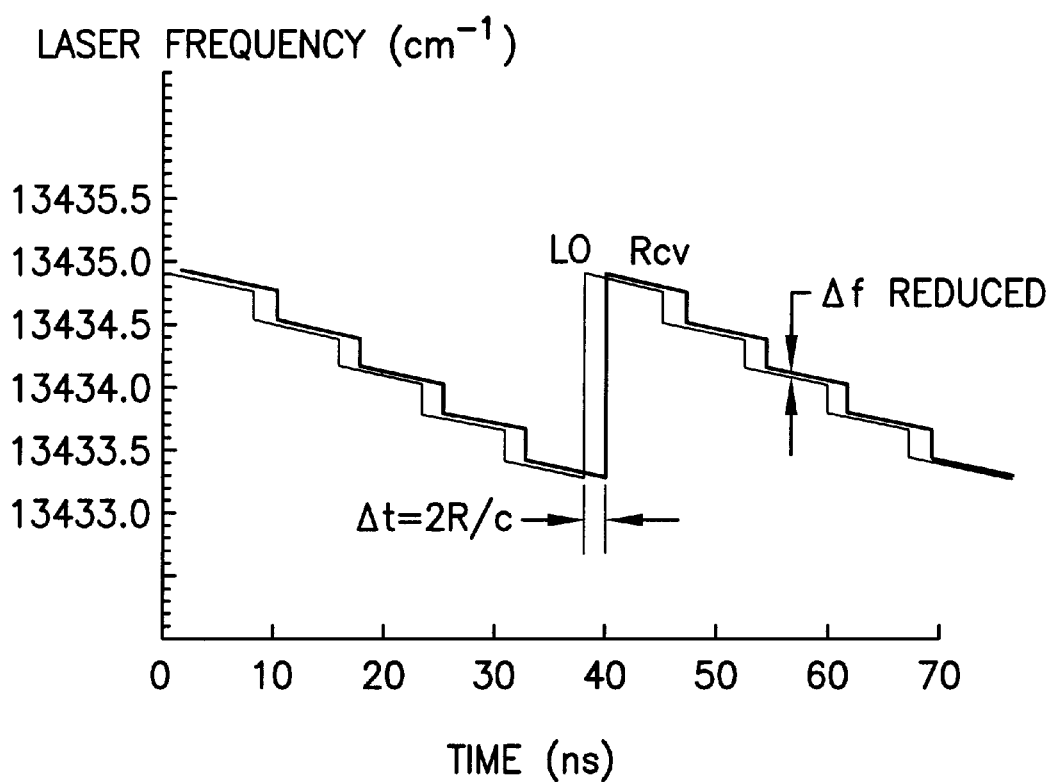

Attention is now directed to FIG. 5, which shows an assembly 42 in accordance with the invention in its third aspect. The assembly 42 comprises the device of FIG. 2, without the subrange scanner, but with the addition of a signal processor 54 for extracting range and intensity information from the photocurrent, and a current-controller to impress a ramp, staircase, or some combination of the two on the diode laser bias current. FIG. 6 shows the simple ramp case, suitable when no subrange scan is used, and FIG. 7 shows the staircase plus ramp, which is more suitable with the subrange scan. In the subrange scan case, the steps of the staircase correspond to moving from one subrange scan position to the next, and the sloping stair tread to a smaller, more gradual change in the laser frequency with time.

Due to the time-of-flight delay, the receive beam's frequency will be slightly different from that of the transmit beam, and the frequency difference will emerge as a beat frequency in the photocurrent. A conventional FM demodulator circuit, of the sort used in entertainment radios, produces a voltage proportional to the frequency deviation, which is digitized to produce a range image. The received signal strength indicator (RSSI) output from the demodulator IC gives a current proportional to the logarithm of the beat signal amplitude, which (after correction for the change in the LO strength with laser tuning) yields an intensity image.

This arrangement thus allows simultaneous capture of range and intensity images, perfectly registered with each other, at little or no additional hardware cost.

The invention as just disclosed can realize significant advantages.

For example, an assembly of the present invention can include a capability for capturing objects, or textures, or documents.

Further, a novel assembly can be configured so as to fit within a total package size of e.g., 125 mm long×50 mm wide×25 mm thick, approximately the dimensions of a chalkboard eraser. In this package, the novel assembly preferably and illustratively can acquire an autofocused, autoscaled 300 dpi monochrome image of an 8.5×11 inch page (7.5×10 inch active area) at a genuine 300 dots per inch, which is low-end laser printer resolution.

Frame time preferably does not exceed 1 second, and 0.5 s or faster is desirable, due to hand tremor. Moreover, the novel assembly preferably can accommodate surface variations and out of plane pointing even (i.e., the scanner not held parallel with the surface) up to at least 20 or 30 mm in a 250 mm range. Its field flatness preferably can maintain 300 dpi resolution everywhere on the page, and it preferably runs on two AA batteries with a reasonable life (1000 frames or so). Its scan size and resolution can allow tradeoffs e.g., 4×5 inches at 600 dpi with the same scanner. Finally, its geometric accuracy can be configured to be within 1 pixel in 20 pixels for small areas, and within 10 pixels overall for an entire page, without allowing for hand motion.

What is claimed:

1. An assembly comprising:
   (1) a laser for producing an optical beam that can be modulated so as to enable time-of-flight ranging;
   (2) a subrange scanner positioned so that it can deviate the path of the optical beam; and
   (3) an interferometer, configured so that when it receives at least a portion of the optical beam from the subrange scanner, it can subdivide it to produce transmit and local oscillator beams, and combine the local oscillator beam with at least a portion of an appropriately directed received beam, if present, to produce a combined beam.

2. An assembly comprising:
   (1) a laser for producing an optical beam that can be modulated so as to enable time-of-flight ranging;
   (2) an interferometer, configured so that when it receives at least a portion of the optical beam from the laser, it can subdivide it to produce transmit and local oscillator beams, and combine the local oscillator beam with at least a portion of an appropriately directed received beam, if present, to produce a combined beam;
   (3) a scanner, that can deflect at least a portion of the transmit beam between set angular limits;
   (4) an optical detector, configured so as to intercept at least a portion of the combined beam and produce an electrical signal containing range or beam strength information; and
   (5) a subrange scanner which deviates the path of the transmit beam.

3. An assembly according to claim 2, in which the subrange scanner can be controlled so as to reduce a scan position error due to the scanner.

4. An assembly according to claim 2, in which the scanner can produce a raster pattern.

5. An assembly according to claim 4, in which the subrange scanner can produce a dither in the frame scan direction, at a rate faster than either the line or frame scan rates of the scanner.

6. An assembly according the claim 5, in which the subranges in adjacent scan lines can overlap.

7. An assembly according to claim 5, in which the measurement data from some of the overlapping portions can be compared, and the spatial relationship between the overlapped sections estimated by comparing these data.

8. An assembly according to claim 5, in which the measurement data from some of the overlapping portions can be compared, to estimate a relative motion component between the assembly and the object surface.

9. An assembly comprising:
   (1) a laser for producing an optical beam that can be modulated so as to enable time-of-flight ranging;
   (2) an interferometer, configured so that when it receives at least a portion of the optical beam from the laser, it can subdivide it to produce transmit and local oscillator beams, and combine the local oscillator beam with at least a portion of an appropriately directed received beam, if present, for producing a combined beam;
   (3) a scanner that can deflect at least a portion of the transmit beam between set angular limits;
   (4) an optical detector, configured so that if a combined beam is present, it can intercept at least a portion of the combined beam, and produce an electrical signal containing range or beam strength information; and
   (5) a signal processor that can receive the electrical signal and can produce outputs corresponding to combined beam strength and a range between the assembly and an object surface;

(6) a subrange scanner for deviating the path of the transmit beam.

10. An assembly according to claim 9, wherein the subrange scanner is disposed so that the optical beam encounters it before it encounters the interferometer.

11. An assembly according to claim 9, wherein the subrange scanner includes a diffraction grating for deflecting the transmit beam in response to a change in its wave length.

12. An assembly according to claim 11, wherein the laser comprises a diode laser.

13. An assembly according to claim 12, wherein the laser can operate with a duty cycle above 5%.

14. An assembly according to claim 12, wherein the laser can be tuned by varying a bias current.

15. An assembly according to claim 14, wherein the bias current comprises a component of the injection current of the laser.

16. An assembly according to claim 14, wherein the bias current variation waveform can be ramp-shaped over at least a portion of its cycle.

17. An assembly according to claim 14, wherein the bias current variation waveform can be staircase-shaped over at least a portion of its cycle.

18. An assembly according to claim 14, wherein the bias current variation waveform can be shaped like a staircase with tilted treads over at least a portion of its cycle.

19. An assembly according to claim 14, wherein the shape of the bias current variation wave-form can be controlled for reducing the variations in total optical dose across the scan range.

20. An assembly according to claim 9, wherein the range information enables control of the state of focus of the transmit beam.

21. An assembly according to claim 9, wherein the range information enables control of the angular limits of the scan, for making the range more nearly perpendicular to an object surface.

22. An assembly according to claim 9, wherein the range information enables control of a distance between the assembly and an object surface.

23. An assembly according to claim 9, wherein the range information enables correction of variations in a distance between the assembly and an object surface.

24. An assembly according to claim 9, wherein the range information enables estimation of the viewing perspective of an object surface as seen from the assembly.

25. An assembly according to claim 9, wherein the range information enables correction of variations in viewing perspective of an object surface as seen from the assembly.

26. An assembly according to claim 9, wherein the signal processor can use a measurement of a beat frequency between the local oscillator and received beams for measuring the time-of-flight of the received beam.

27. An assembly according to claim 26, wherein the signal processor can use a measurement of the strength of a beat signal between the local oscillator and received beams for measuring the strength of the received beam.

28. An assembly according to claim 9, wherein the signal processor comprises a filter for rejecting changes in the baseline of the beat signal and undesired amplitude modular of the optical beam.

* * * * *